US010178627B2

(12) United States Patent
Hampel et al.

(10) Patent No.: US 10,178,627 B2
(45) Date of Patent: Jan. 8, 2019

(54) PERFORMANCE MONITORING IN MISSION-CRITICAL WIRELESS NETWORKS

(71) Applicant: QUALCOMM Incorporated, San Diego, CA (US)

(72) Inventors: Karl Georg Hampel, New York, NY (US); Vincent Douglas Park, Budd Lake, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 147 days.

(21) Appl. No.: 15/266,764

(22) Filed: Sep. 15, 2016

(65) Prior Publication Data
US 2017/0181127 A1    Jun. 22, 2017

Related U.S. Application Data

(60) Provisional application No. 62/268,886, filed on Dec. 17, 2015.

(51) Int. Cl.
H04W 72/04    (2009.01)
H04W 52/18    (2009.01)
H04L 5/00     (2006.01)
H04W 24/08    (2009.01)
H04W 24/10    (2009.01)
H04W 76/20    (2018.01)

(52) U.S. Cl.
CPC ........... *H04W 52/18* (2013.01); *H04L 5/0048* (2013.01); *H04L 5/0055* (2013.01); *H04W 24/08* (2013.01); *H04W 24/10* (2013.01); *H04W 76/20* (2018.02)

(58) Field of Classification Search
None
See application file for complete search history.

(56) References Cited

U.S. PATENT DOCUMENTS

2005/0147042 A1* 7/2005 Purnadi ............... H04L 1/1877
                                                    370/236
2006/0077939 A1   4/2006 Salokannel et al.
2006/0221815 A1* 10/2006 Matsumoto ............ H04L 41/06
                                                    370/216

(Continued)

OTHER PUBLICATIONS

Partial International Search Report—PCT/US2016/065772—ISA/EPO—dated Mar. 13, 2017.

(Continued)

*Primary Examiner* — Jay P Patel
(74) *Attorney, Agent, or Firm* — Haynes and Boone, LLP

(57) ABSTRACT

Systems and methods are disclosed for using a monitoring application to measure channel state information during idle cycles in a mission-critical application. A first wireless communication device determines whether there is a mission-critical data packet to be transmitted to a second wireless communication device. If not, the first wireless communication device determines whether a monitoring packet should be transmitted to the second wireless communication device. If the first wireless communication device determines a monitoring packet should be sent, the first wireless communication devices transmits a monitoring packet containing an identifier and a reference signal to the second wireless communication device.

40 Claims, 11 Drawing Sheets

(56) References Cited

U.S. PATENT DOCUMENTS

| | | |
|---|---|---|
| 2008/0080436 A1 | 4/2008 | Sandhu et al. |
| 2009/0165137 A1* | 6/2009 | Yoo ................... G06F 21/564 726/24 |
| 2009/0310500 A1* | 12/2009 | Matsuda ............ H04L 43/0864 370/252 |
| 2010/0034145 A1* | 2/2010 | Kim .................. H04W 52/0216 370/328 |
| 2013/0021923 A1 | 1/2013 | Morgan et al. |
| 2013/0223398 A1 | 8/2013 | Li et al. |
| 2014/0128089 A1 | 5/2014 | Jang et al. |
| 2014/0169178 A1 | 6/2014 | Nagata |
| 2015/0223257 A1 | 8/2015 | Wilhelmsson et al. |
| 2015/0334596 A1* | 11/2015 | Szilagyi ............ H04W 28/0289 370/232 |
| 2016/0360489 A1* | 12/2016 | Boodannavar ....... H04B 7/0413 |

OTHER PUBLICATIONS

International Search Report and Written Opinion—PCT/US2016/065772—ISA/EPO—dated Jun. 20, 2017.

\* cited by examiner

PERFORMANCE MONITORING IN MISSION-CRITICAL WIRELESS NETWORKS

CROSS REFERENCE TO RELATED APPLICATIONS & PRIORITY CLAIM

The present application claims priority to and the benefit of the U.S. Provisional Patent Application No. 62/268,886, filed Dec. 17, 2015, which is hereby incorporated by reference in its entirety.

TECHNICAL FIELD

This application relates to wireless communications systems, and in particular to monitoring for channel deterioration and estimating channel state in wireless networks with latency-critical applications that require very low packet error rates.

INTRODUCTION

Wireless technology is prevalent in sensor and control device networks. In mission-critical sensor and control networks, such as factory automation networks, error tolerances are extremely low. In some cases, error tolerances may be as low as one in a billion packet losses. As a result, it is very difficult to measure channel state. There is therefore a need for systems and methods to monitor for channel deterioration in applications where packet errors are only tolerated once in a week, month or even year.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes determining, at a first wireless communication device, whether there is a data packet to be transmitted to a second wireless communication device, determining, at the first wireless communication device, whether a monitoring packet should be transmitted to the second wireless communication device if it is determined that no data packet needs to be transmitted, and transmitting, from the first wireless communication device to the second wireless communication device, the monitoring packet, wherein the monitoring packet includes an identifier and a reference signal.

In an additional aspect of the disclosure, a method of wireless communication includes receiving, at a communication device from a first wireless communication device, a channel state alert along with at least one of uplink channel measurement data or downlink channel measurement data in response to the first wireless communication device determining based on at least one of the uplink channel measurement data or the downlink channel measurement data, received from a second wireless communication device, that the channel state alert should be sent, and determining, at the communication device, based on the channel state alert, the uplink channel measurement data or the downlink channel measurement data whether channel resource reallocation is necessary to avoid errors.

In an additional aspect of the disclosure, a first wireless communication device includes a processor configured to determine whether there is a data packet to be transmitted to a second wireless communication device, the processor further configured to determine, if there is no data packet to be transmitted, whether a monitoring packet including an identifier and a reference signal should be transmitted to the second wireless communication device, and a transceiver configured to transmit the monitoring packet to the second wireless communication device.

In an additional aspect of the disclosure, a communication device includes a transceiver configured to receive, from a first wireless communication device, a channel state alert along with at least one of uplink channel measurement data or downlink channel measurement data in response to the first wireless communication device determining based on at least one of the uplink channel measurement data or the downlink channel measurement data, received from a second wireless communication device, that the channel state alert should be sent, and a processor configured to determine, based on the channel state alert, the uplink channel measurement data or the downlink channel measurement data whether channel resource reallocation is necessary to avoid errors.

In an additional aspect of the disclosure, a computer-readable medium having program code recorded thereon includes code for causing a first wireless communication device to determine whether there is a data packet to be transmitted to a second wireless communication device, code for causing the first wireless communication device to determine whether a monitoring packet should be transmitted to the second wireless communication device if it is determined that no data packet needs to be transmitted, and code for causing the first wireless communication device to transmit to the second wireless communication device the monitoring packet, wherein the monitoring packet includes an identifier and a reference signal.

In an additional aspect of the disclosure, a computer-readable medium having program code recorded thereon includes code for causing a communication device to receive, from a first wireless communication device, a channel state alert along with at least one of uplink channel measurement data or downlink channel measurement data in response to the first wireless communication device determining based on at least one of the uplink channel measurement data or the downlink channel measurement data, received from a second wireless communication device, that the channel state alert should be sent, and code for causing the communication device to determine, based on the channel state alert, the uplink channel measurement data or the downlink channel measurement data whether channel resource reallocation is necessary to avoid errors.

In an additional aspect of the disclosure, a first wireless communication device includes means for determining whether there is a data packet to be transmitted to a second wireless communication device, means for determining whether a monitoring packet should be transmitted to the second wireless communication device if it is determined that no data packet needs to be transmitted, and means for transmitting to the second wireless communication device the monitoring packet, wherein the monitoring packet includes an identifier and a reference signal.

In an additional aspect of the disclosure, a communication device includes means for receiving, from a first wireless communication device, a channel state alert along with at least one of uplink channel measurement data or downlink channel measurement data in response to the first wireless communication device determining based on at least one of the uplink channel measurement data or the downlink channel measurement data, received from a second wireless communication device, that the channel state alert should be sent, and means for determining, based on the channel state alert, the uplink channel measurement data or the downlink channel measurement data whether channel resource reallocation is necessary to avoid errors Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
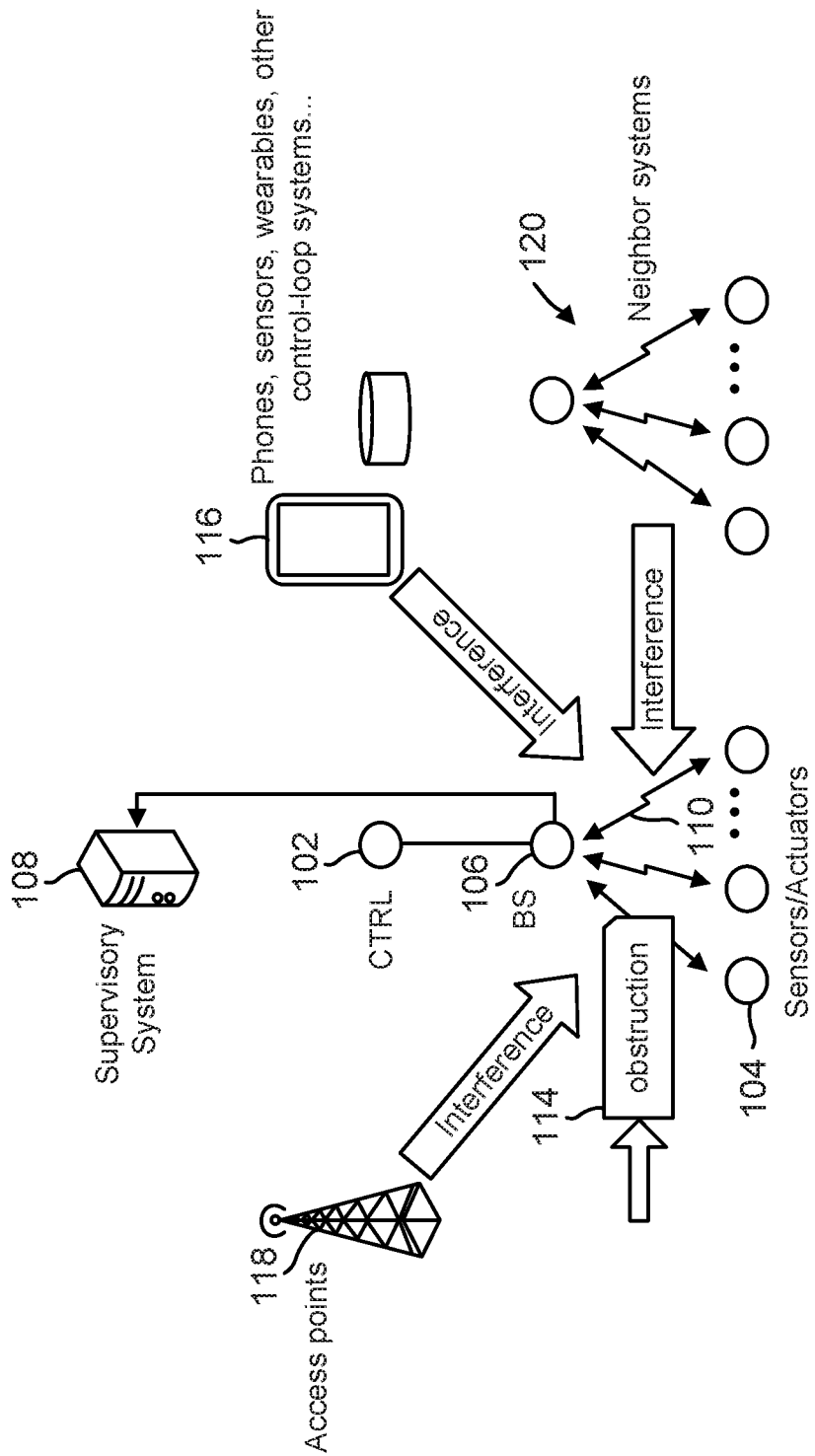
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Embodiments of the present disclosure describe a system for ensuring reliability of wireless links in mission-critical wireless applications such as factory automation sensor and actuator networks used for control-loop applications. In such systems, packet error rates (PER) as low as $1 \times 10^{-9}$ may be required, as a single packet drop could cause catastrophic results, such as a robot malfunctioning and injuring a bystander. Additionally, such a system may have strict latency requirements of 1-3 ms maximum per transmission. If packets are not successfully transmitted in this window, a piece of equipment could fail to take a necessary action, resulting in shutdown of at least part of the factory facility.

In such a system, predicting deterioration of the channel before it happens can be especially important. This process is known as channel state information (CSI) estimation, or channel estimation. Many common channel estimation methods rely on either measuring actual errors or deriving packet error statistics from SINR measurements. However, in a system designed to have a PER on the order of $1 \times 10^{-9}$, actual errors as well as low SINR events will be extremely rare, and these traditional error estimation techniques will take too much time to determine a reliable channel estimation. Moreover, performing reliable SINR measurements requires adding reference symbol strings to each packet sent, which increases bandwidth required in an already bandwidth limited system. Furthermore, in certain environments such as factory automation control-loop applications, a low duty cycle is desirable in order to allow other control-loop networks to operate in close proximity, and increasing the duty cycle to add reference symbol strings could cause interference with neighboring control-loop networks.

In some embodiments of the present disclosure, a separate channel monitoring application may perform channel measurement by sending monitoring packets over the channel during idle periods in the mission-critical application. For example, a control-loop factory automation application using an Automatic Repeat reQuest (ARQ) protocol with a $1 \times 10^{-9}$ PER requirement, only one in every billion packets is dropped, and therefore the application will very rarely use channel resources allocated for re-transmissions of dropped packets. However, those resources must be allocated in the rare event that a packet does drop, since a single missed packet could be catastrophic, as described above. A monitoring application could instead use the resources allocated for re-transmission to perform channel estimation.

Regularly using re-transmission resources for monitoring packets increases the potential for interference with neighboring networks running mission-critical applications, so the monitoring application may try to optimize the amount of monitoring packets sent in order to reliably measure the CSI while minimizing interference with neighboring networks.

The monitoring packets may additionally be transmitted at a much lower power level than mission-critical packets. In some embodiments, as much as 10-100 times lower power may be used for monitoring packet transmissions. This serves to further reduce interference with neighboring networks, and in situations where the monitoring packet transmissions are made in the unlicensed frequency band, may allow the transmissions to avoid the FCC's "listen before talk" (LBT) requirements.

The lower power level transmission may result in monitoring packets being dropped more frequently. This is acceptable as monitoring packets are not mission-critical. Furthermore, it is actually desirable for purposes of measuring CSI. First, the reduction in SINR caused by lowering transmission power increases the chance of low SINR events occurring, which allows for more effective measurement of low SINR events in the channel. Second, the reduction in SINR allows channel measurements to be conducted with low dynamic range.

FIG. 1 illustrates a wireless communication network 100 in accordance with various aspects of the present disclosure. The wireless network 100 may include a controller device 102, a number of sensor or actuator devices (SAs) 104, and a base station (BS) 106 with a wired connection to the controller 102. In some embodiments the BS 106 and controller 102 may be integrated as a single device. A base station may include an evolved Node B (eNodeB) in the LTE context, for example or a WiFi access point. A base station may also be referred to as a base transceiver station or an access point. For simplicity of discussion, it will be referred to herein as a base station. The base station may be one of various types of base station such as a macro, pico, and/or femto base station.

The SAs 104 may include various types of wireless devices that integrate sensors or meters to capture information such as smart meters, temperature sensors, strain sensors, pressure sensors, fluid flow monitors, water level monitors, equipment monitors, weather and geological event monitors, location trackers, accelerometers, infrared sensors, and the like. The SAs 104 may further include various types of wireless devices that integrate actuators to cause attached devices such as robots or other machinery to perform actions such as turning on or off, or moving one or more components. In some embodiments, the SAs 104 may be "internet of everything" (IOE) or "internet of things" (IOT) devices. The SAs 104 may be low power devices designed to run on compact batteries for extended periods of time. The SAs 104 may be attached to various devices, such as robots, in a factory automation system. The controller 102 and SAs 104 may be dispersed throughout the wireless network 100, and each controller 102 or SA 104 may be stationary or mobile.

There are wireless links 110 between controller device 102 and SAs 104. The controller device 102 and SAs 104 actively transmit data back and forth over wireless links 110. There are various interferences in the network 100, including obstruction 114, mobile devices 116, wireless access point (AP) 118, and neighboring mission-critical networks 120. These new objects may cause transmission failures over links 110. For example, obstruction 114 may be an object situated between one or more SAs 104 and controller 102 which causes shadow fading in links 110. The obstruction 114 may be a moving object as indicated by the arrow in FIG. 1, for example a person, a fork lift, or a piece of automated equipment in a factory environment. Alternatively, SA 104 or BS 106 may be in motion, and obstruction 114 may be a stationary object such as a wall that is positioned to obstruct link 110 by the movement of the SA 104 or BS 106.

Mobile devices 116, AP 118, and neighboring networks 120 may transmit using the same time and frequency resources as the controller 112 and SAs 104, and may thereby cause collisions in the communications between controller 102 and SAs 104. For example, an employee in a factory environment may walk through network 100 carrying a mobile device 116, or a piece of factory equipment such as a high frequency welder may emit electromagnetic energy at high power in the unlicensed band. Additionally, a device in neighboring network 120 may be attached to a piece of factory equipment that moves into range of network 100 and causes interference.

A supervisory system 108 is connected to the BS 106 (or the controller 102, if the BS 106 and controller 102 are integrated). The supervisory system 108 may be connected to the BS 106 by wireline. The supervisory system 108 may take feedback from a monitoring application to measure channel quality. For example, the BS 106 may send to and receive from SAs 104 monitoring packets which facilitate channel measurement and contain channel measurement data, as further described below. The monitoring packets are passed on to the supervisory system 108 for analysis. Based on its analysis, the supervisory system 108 may instruct the BS 106 to modify its resource allocation (i.e., the time and frequency resources allocated to each SA 104 and BS 106 for transmissions) to avoid interference, as described further below.

Embodiments of this disclosure are directed to any type of modulation scheme, but frequency division multiplexing (FDM) is used as a representative modulation for data transmissions in the downlink to SAs 104 and the uplink to controller 102. FDM is a multi-carrier modulation technique that partitions the overall system bandwidth into multiple frequency subbands, carrier frequencies, or channels. With FDM, each channel may be modulated with data.

The controller 102 may periodically send synchronization signals to the SAs 104. These synchronization signals are used to enable the SAs 104 to periodically synchronize their local clocks with the clock of the base station 106. This often becomes necessary because the clocks of the SAs 104 may be less accurate due to low power demands imposed on them. Thus, over time the clocks for the SAs 104 may drift relative to the clock of the BS 106, which may be a higher power device that tends to be more accurate and stable. Due to the drift, an offset arises between the time at which a receiver of a given SA 104 wakes up to listen for a signal from the BS 106 and the time at which the receiver of the given SA 104 actually receives the signal from the base BS 106. If the drift becomes large enough, then the given SA 104 will no longer be able to decode the signal received from the BS 106. The synchronization signal provides the information necessary for the SAs 104 to re-synchronize to the BS 106 clock.

The synchronization signal may be periodically sent, for example at pre-specified time intervals that the SAs 104 are made aware of. For example, this may be established at a time of initial setup such as when an SA 104 attaches to the network via the BS 106. Alternatively, or in addition, the BS 106 may establish the periodicity of the synchronization signal, as well as what frequency and time at which the synchronization signal will be transmitted, with a command sent to the SAs 104 to place them into sleep mode. The synchronization signal may be embedded within an FDM downlink waveform that includes other information (such as data or control information) for one or more other SAs 104. The synchronization signal may be broadcast to all SAs 104 within range of the FDM downlink waveform and be modulated according to a different modulation scheme than that used for rest of the FDM downlink waveform. The SAs 104 within the network 100 may wake up at the pre-specified times that the synchronization signal is broadcast to re-sync to the clock of the BS 106, as described above.

Figure 2:
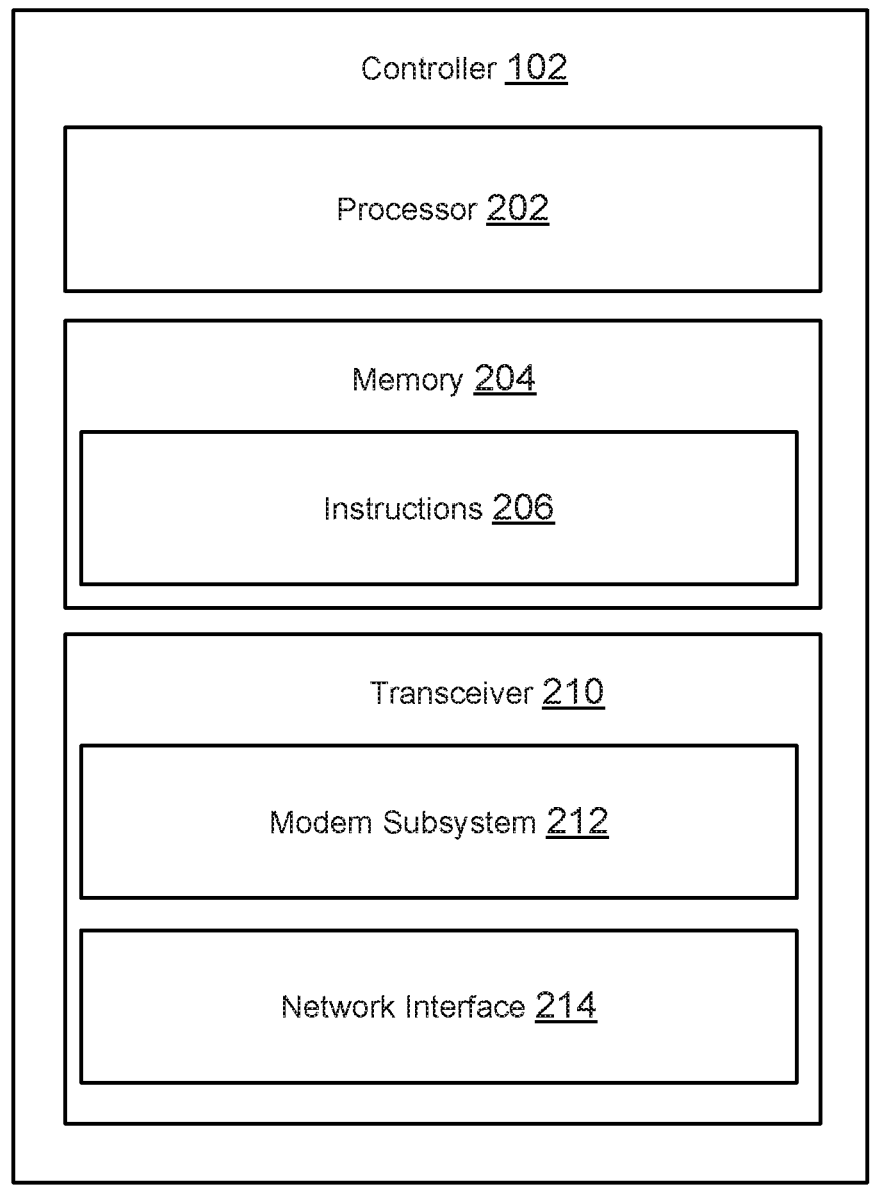
FIG. 2 is a block diagram illustrating an exemplary controller in accordance with various aspects of the present disclosure.
Figure 3:
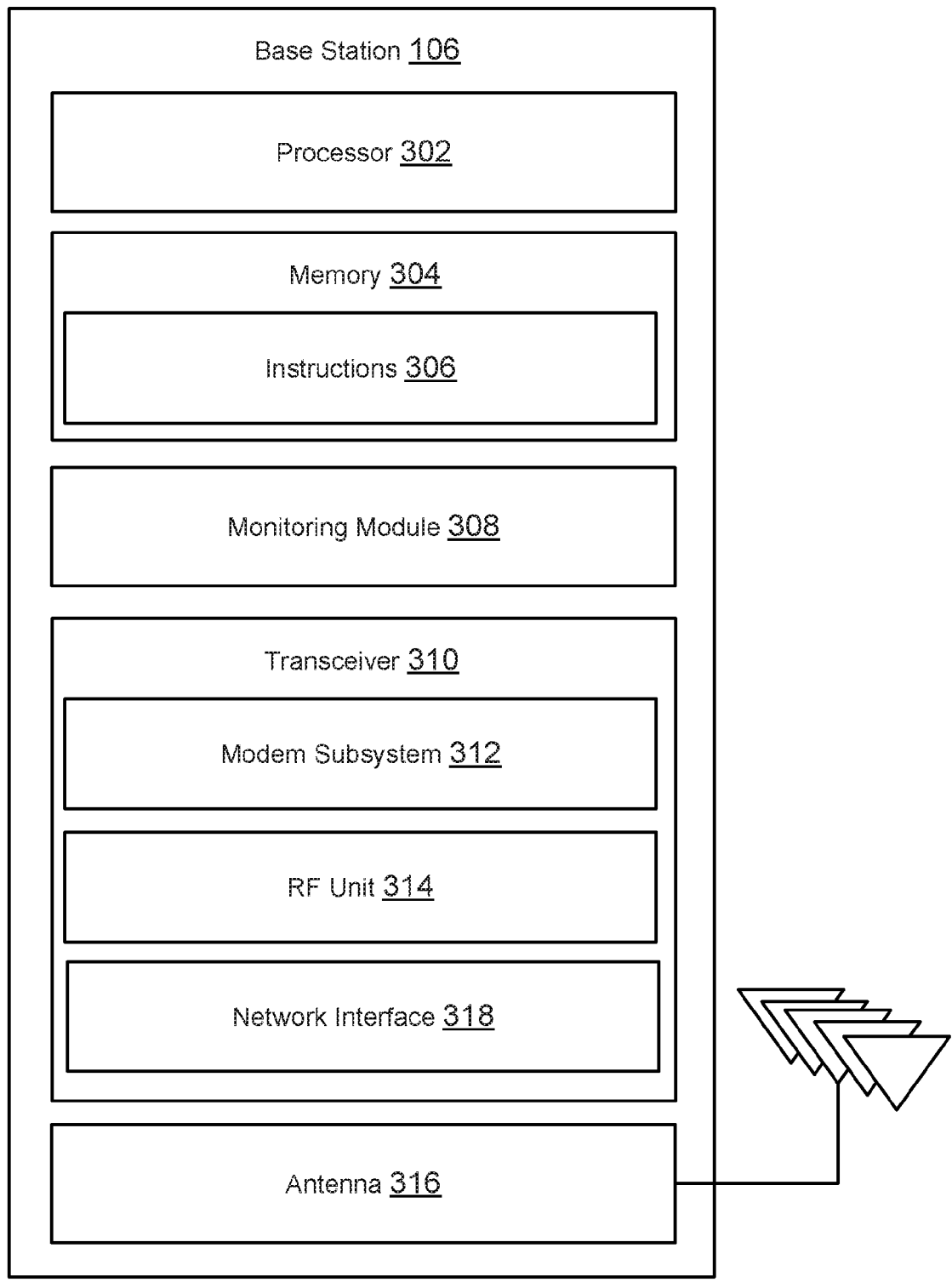
FIG. 3 is a block diagram illustrating an exemplary base station in accordance with various aspects of the present disclosure.

FIG. 2 is a block diagram illustrating an exemplary controller 102 according to embodiments of the present disclosure. The controller 102 may include a processor 202, a memory 204, and a transceiver 210. These elements may be in direct or indirect communication with each other, for example via one or more buses. As mentioned above with respect to FIG. 1, the controller 102 may communicate with a BS 106. In some cases the controller 102 and the BS 106 may be part of one device. In this case, the functions of the BS 106, described below with respect to FIG. 3, are integrated with those of controller 102.

The processor 202 may include a CPU, a DSP, an ASIC, a controller, a FPGA device, another hardware device, a firmware device, or any combination thereof configured to perform the operations described herein with reference to the controller 102 introduced in FIG. 1 above. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the controller 102 in connection with embodiments of the present disclosure. Instructions 206 may also be referred to as code, which may be interpreted broadly to include any type of computer-readable statement(s).

The transceiver 210 may include a modem subsystem 212. The transceiver 210 is configured to communicate bi-directionally with other devices, such as the BS 106. The modem subsystem 212 may be configured to modulate and/or encode data according to a modulation and coding scheme (MCS), e.g., a low-density parity check (LDPC) coding scheme, a turbo coding scheme, a convolutional coding scheme, etc.

The modem subsystem 212 may modulate and encode data. Although shown as integrated together in transceiver 210, the modem subsystem 212 and the network interface 214 may be separate devices that are coupled together at the controller 102 to enable the controller 102 to communicate with other devices.

The transceiver 210 may further include a network interface 214. The modem subsystem 212 may provide the modulated and/or processed data, e.g. data packets, to the network interface 214 for transmission to one or more other wired devices such as the BS 106. The network interface 214 may further receive data messages transmitted from a BS 106, and provide the received data messages for processing and/or demodulation at the transceiver 210. In some embodiments, the network interface 214 may include wireless communication capabilities and the controller may include an antenna, for example, as described below with reference to the BS 106 of FIG. 3.

FIG. 3 is a block diagram illustrating an exemplary BS 106 according to embodiments of the present disclosure. The BS 106 may include a processor 302, a memory 304, a monitoring module 308, a transceiver 310, and an antenna 316. These elements may be in direct or indirect communication with each other, for example via one or more buses. As mentioned above with respect to FIG. 1, the BS 106 may communicate with multiple SAs 104, a controller 102, and a supervisory system 108.

The processor 302 may include a CPU, a DSP, an ASIC, a controller, a FPGA device, another hardware device, a firmware device, or any combination thereof configured to perform the operations described herein with reference to the BS 106 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the BS 106 in connection with embodiments of the present disclosure. Instructions 306 may also be referred to as code, which may be interpreted broadly to include any type of computer-readable statement(s).

The monitoring module 308 may be configured to provide the information necessary to create a monitoring packet. In some embodiments, this may include a fingerprint that allows a receiver to distinguish the monitoring packet from work cycle (i.e., data) packets as well as a reference signal that allows the receiver to perform a channel estimate. The monitoring packets may further contain additional data fields to convey information about channel measurements conducted in the opposite direction, i.e. channel measurements conducted based upon monitoring packets received from an SA 104 at the BS 106.

The transceiver 310 may include a modem subsystem 312, a radio frequency (RF) unit 314, and a network interface 318. The transceiver 310 is configured to communicate bi-directionally with other devices, such as one or more SAs 104 and a supervisory system 108. The modem subsystem 312 may be configured to modulate and/or encode data according to a modulation and coding scheme (MCS), e.g., a low-density parity check (LDPC) coding scheme, a turbo coding scheme, a convolutional coding scheme, etc.

The RF unit 314 may be configured to process (e.g., perform analog to digital conversion or digital to analog conversion, etc.) modulated/encoded data from the modem subsystem 312 (on outbound transmissions) or transmissions originating from another source such as an SA 104. The modem subsystem 312 may further provide the modulated and/or processed data, e.g. data packets, to the network interface 318 for transmission to one or more other wired devices such as the controller 102 and the supervisory system 108. The network interface 318 may further receive data messages transmitted from a controller 102 and the supervisory system 108, and provide the received data messages for processing and/or demodulation at the transceiver 310. Although shown as integrated together in transceiver 310, the modem subsystem 312 and the RF unit 314 may be separate devices that are coupled together at the BS 106 to enable the BS 106 to communicate with other devices.

The RF unit 314 may provide the modulated and/or processed data, e.g. data packets, to the antenna 316 for transmission to one or more other devices such as SAs 104. After the transceiver 310 receives information with a fingerprint and reference signal from the monitoring module 308, the modem subsystem 312 may modulate and/or encode the identifying information in preparation for transmission. The RF unit 314 may receive the modulated and/or encoded data packet and process the data packet prior to passing it on to the antenna 316. This may include, for example, transmission of data messages to one or more SAs 104 according to embodiments of the present disclosure. The antenna 316 may further receive data messages transmitted from an SA 104, and provide the received data messages for processing and/or demodulation at the transceiver 310. As illustrated, the antenna 316 may include multiple antennas of similar or different designs in order to sustain multiple transmission links.

Figure 4:
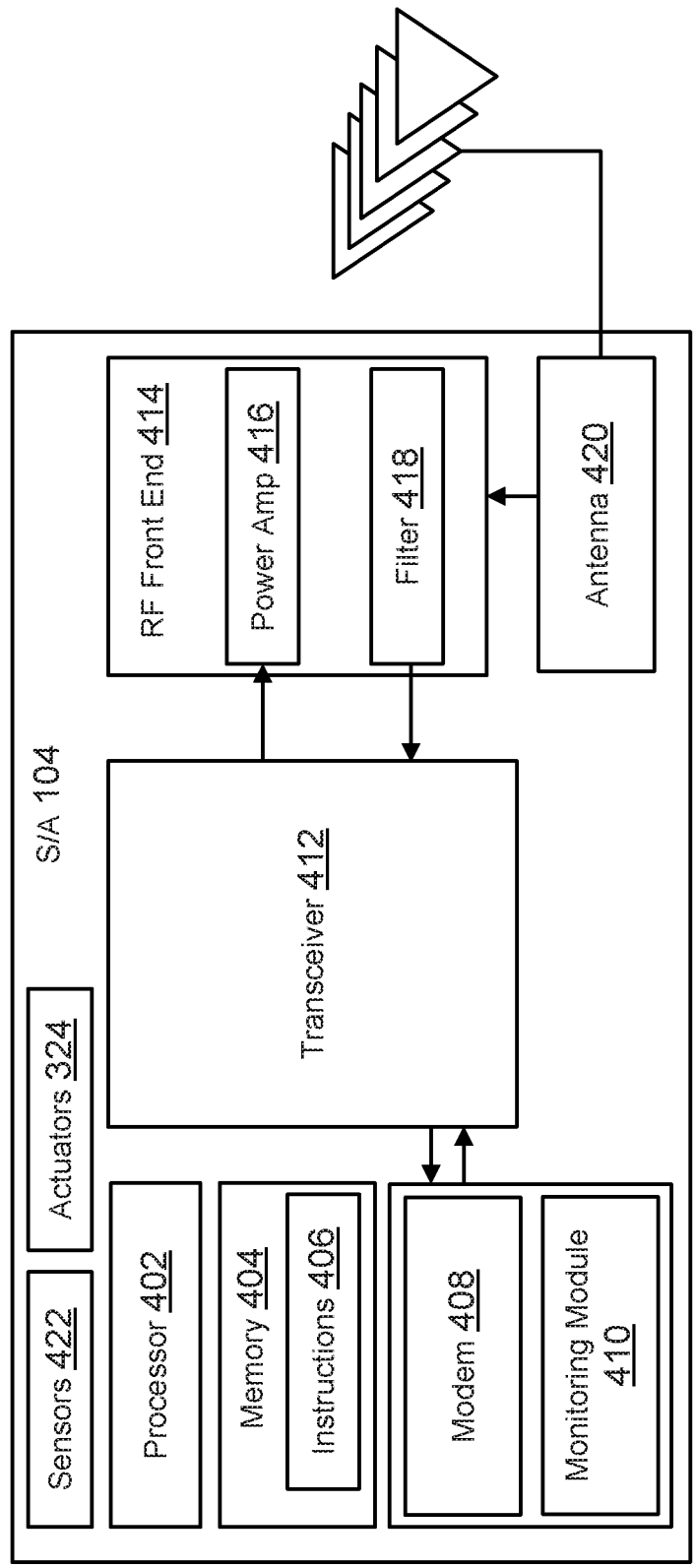
FIG. 4 is a block diagram illustrating an exemplary sensor or actuator device accordance with various aspects of the present disclosure.

FIG. 4 is a block diagram of an exemplary SA 104 according to embodiments of the present disclosure. The SA 104 may include a processor 402, a memory 404, a modem 408, a monitoring module 410, a transceiver 412, an RF front end 414, and an antenna 420. These elements may be in direct or indirect communication with each other, for example via one or more buses. As mentioned above with respect to FIG. 1, the SA 104 may communicate with a BS 106 and other SAs 104 that are within range.

The processor 402 may include a CPU, a DSP, an ASIC, a controller, a FPGA device, another hardware device, a firmware device, or any combination thereof configured to perform the operations described herein with reference to the SA 104 introduced in FIG. 1 above. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the SA 104 in connection with embodiments of the present disclosure. Instructions 406 may also be referred to as code, which may be interpreted broadly to include any type of computer-readable statement(s).

The modem subsystem 408 may be configured to modulate and/or encode data according to a modulation and coding scheme (MCS), e.g., a low-density parity check (LDPC) coding scheme, a turbo coding scheme, a convolutional coding scheme, etc.

The monitoring module 410 may be configured to provide the information necessary to create a monitoring packet. In some embodiments, this may include a fingerprint that allows a receiver to distinguish the monitoring packet from work cycle (i.e., data) packets as well as a reference signal that allows the receiver to perform a channel estimate. The monitoring packets may further contain additional data fields to convey information about channel measurements conducted in the opposite direction, i.e. channel measurements conducted based upon monitoring packets received from a BS 106 at the SA 104.

The transceiver 412 may include a transmitter and a receiver and any other components to allow transmission and reception of data, for example to process (e.g., perform analog to digital conversion or digital to analog conversion, etc.) modulated/encoded data from the modem subsystem 308 (on outbound transmissions) or transmissions originating from another source such as an SA 104. For the transmitter, this may include digital to analog conversion, a local oscillator, and upconversion of baseband signals to the selected transmission frequency, to name just a few examples. For the receiver, this may include a down converter to put the received signal at baseband, a baseband filter, and an analog-to-digital converter to name a few examples.

The RF front end 414 may include a filter 418, which may be for example a band-pass filter to filter out-of-band signals. The RF front end 414 may also include an impedance matching circuit and an amplifier 416. Although illustrated as separate, as will be recognized some aspects described above with respect to the transceiver 412 may be performed by the RF front end 414 (e.g., upconversion, downconversion, and mixing) and vice versa. The RF front end 414 may provide the modulated and/or processed data, e.g. data packets, to the antenna 420 for transmission to the BS 106 or other SAs 104.

The antenna 420 may include one or multiple antennas of similar or different designs in order to sustain a single or multiple transmission links, respectively. The antenna 420 of the SA 104 may transmit data provided from the transceiver 412 after modulation and coding from the modem subsystem 408 and amplification at the RF front end 414. The antenna 420 of the SA 104 may also receive data from multiple sources, including from a BS 106. The antenna 420 may feed the received data to the RF front end 414.

In an exemplary embodiment, the SA 104 may wake up at a first, pre-specified time in order to listen on a specified, pre-determined frequency for a synchronization signal from the BS 106. The SA 104 may correlate the signal to a stored code for the synchronization signal and, based on this comparison, correct a clock offset local to the SA 104 (which may be less accurate due to the low-power nature of the device) to be time aligned with the clock of the BS 106 (which may be more accurate).

In a further exemplary embodiment, the SA 104 may wake up at a second, pre-specified time in order to listen on a specified, pre-determined frequency for a global scheduling data signal. The SA 104 may have stored in memory 304 or elsewhere an identifier, or fingerprint, for global scheduling data signals. The SA 104 may compare the received global scheduling data signal against the stored fingerprint to determine that global scheduling data has been received. The SA 104 may store the global scheduling data for use in further embodiments described below. In an alternative embodiment, the global scheduling data may be predetermined via a standard or may be configured on the SA 104.

In a further exemplary embodiment, the SA 104 may wake up at a third, pre-specified time in order to listen on a specified, pre-determined frequency for data transmissions or ACK/NACK signals transmitted from the BS 106. The pre-specified time and frequency are, in this embodiment, based on the global scheduling data received from the BS 106 as described above. For example, the SA 104 will wake up and listen during time slots and on frequencies scheduled for data and ACK/NACK transmissions.

In a further exemplary embodiment, the SA 104 may wake up at a fourth, pre-specified time in order to listen on a specified, pre-determined frequency for monitoring packets transmitted from the BS 106. The pre-specified time and frequency are, in this embodiment, based on the global scheduling data received from the BS 106 as described above. For example, the SA 104 will wake up and listen during time slots and on frequencies scheduled for data re-transmissions. Based upon receipt of an earlier ACK, the SA 104 may know that a re-transmission is not needed, but may instead wake up to listen for monitoring packets. This is described in further detail below.

Figure 5:
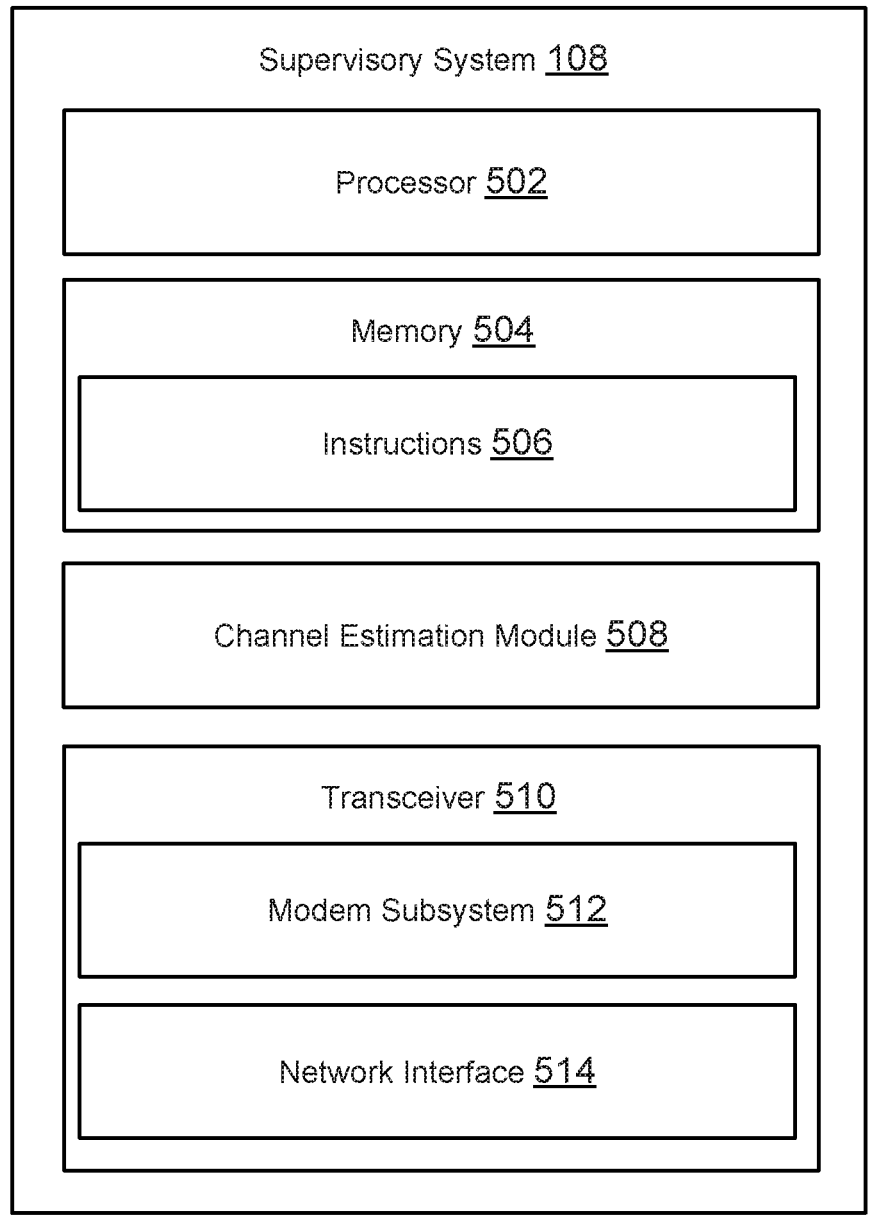
FIG. 5 is a block diagram illustrating an exemplary supervisory system in accordance with various aspects of the present disclosure.

FIG. 5 is a block diagram illustrating an exemplary supervisory system 108 according to embodiments of the present disclosure. The supervisory system 108 may include a processor 502, a memory 504, a channel estimation module 508, a transceiver 510, an antenna 516, and a network interface 518. These elements may be in direct or indirect communication with each other, for example via one or more buses. As mentioned above with respect to FIG. 1, the supervisory system 108 may communicate with the BS 106.

The processor 502 may include a CPU, a DSP, an ASIC, a controller, a FPGA device, another hardware device, a firmware device, or any combination thereof configured to perform the operations described herein with reference to the supervisory system 108 introduced in FIG. 1 above. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the supervisory system 108 in connection with embodiments of the present disclosure. Instructions 506 may also be referred to as code, which may be interpreted broadly to include any type of computer-readable statement(s).

The channel estimation module 508 may be configured to use channel measurement information contained in monitoring packets to analyze channel state. In some embodiments, the channel estimation module 508 may determine from its channel estimation that different channel resources should be allocated to the BS 106 and the SAs 104. The channel estimation module 508 may create instructions for the BS 106 telling it to reallocate resources accordingly, and telling it to inform the SAs 104 of this reallocation, for example by updating the global scheduling data described above.

The transceiver 510 may include a modem subsystem 512. The transceiver 510 is configured to communicate bi-directionally with other devices, such as the BS 106. The modem subsystem 512 may be configured to modulate and/or encode data according to a modulation and coding scheme (MCS), e.g., a low-density parity check (LDPC) coding scheme, a turbo coding scheme, a convolutional coding scheme, etc.

The modem subsystem 512 may modulate and encode data. Although shown as integrated together in transceiver 510, the modem subsystem 512 and the network interface 514 may be separate devices that are coupled together at the supervisory system 108 to enable the supervisory system 108 to communicate with other devices.

The modem subsystem 512 may provide the modulated and/or processed data, e.g. data packets, to the network interface 514 for transmission to one or more other wired devices such as the BS 106. The network interface 514 may further receive data messages transmitted from a BS 106, and provide the received data messages for processing and/or demodulation at the transceiver 510. In some embodiments, the network interface 514 may include wireless communication capabilities and the controller may include an antenna, for example, as described above with reference to the BS 106 of FIG. 3.

Figure 6:
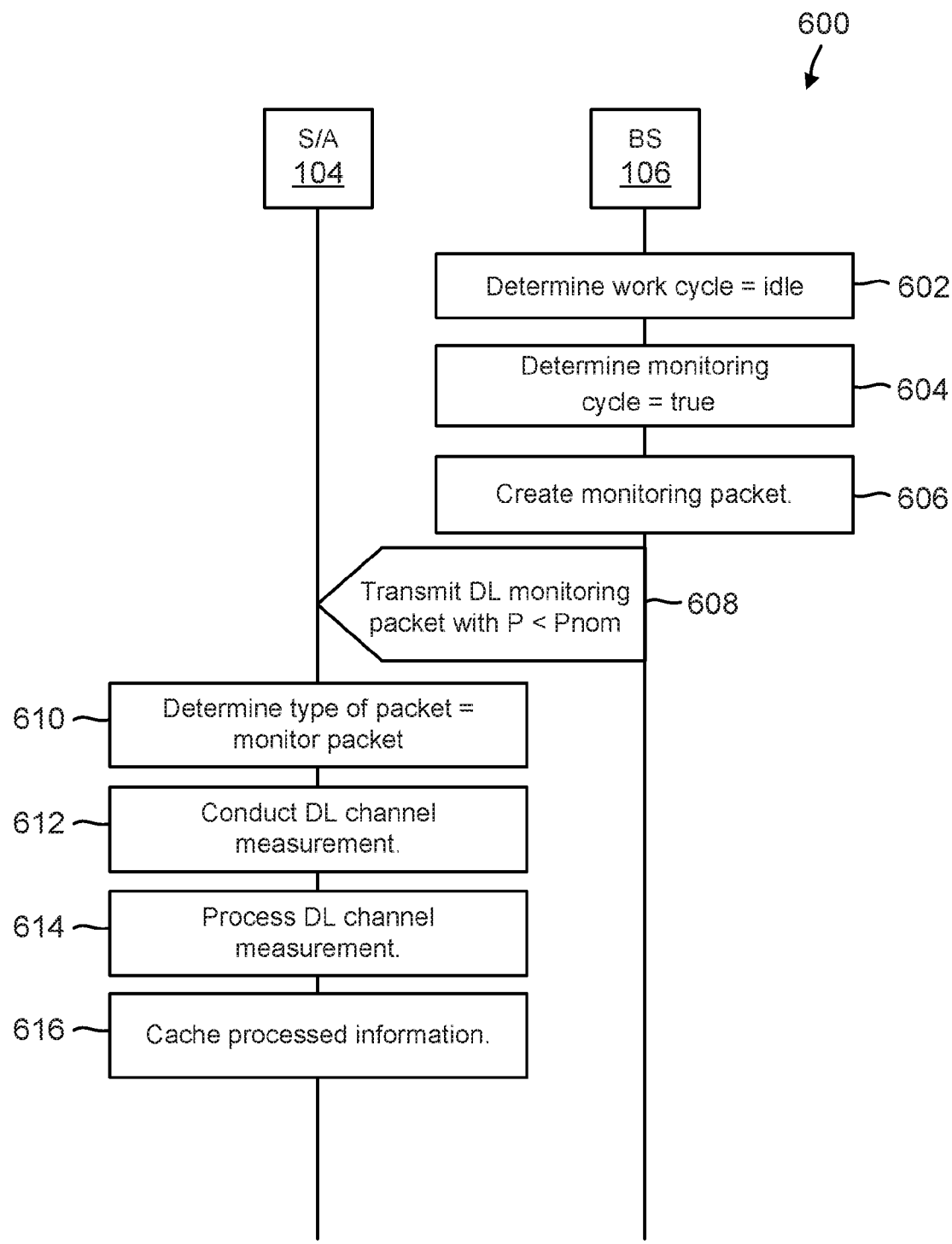
FIG. 6 is an illustration of a call flow of downlink monitoring, from the base station to a sensor or actuator device, according to one aspect of the present disclosure.

FIG. 6 illustrates a call flow 600 of downlink (DL) monitoring, from the BS 106 to an SA 104, according to one aspect of the present disclosure. Beginning at block 602, the BS 106 at each opportunity for transmission determines whether it has a work packet to send or if the wireless link 110 will be idle. For example, the BS 106 may have received an ACK signal after transmitting data, and may subsequently determine that a certain number of subsequent frames scheduled for re-transmission will be unused for re-transmission. Alternatively, the BS 106 may be scheduled to transmit data but may have no data needs to be transmitted.

At block 604, if the system is idle, the BS 106 may determine if a monitoring packet should be sent. It is advantageous for the system to have as many idle frames as possible in order to reduce interference with neighboring mission-critical networks 120. Therefore, the system may have a predetermined rate of monitoring packets that trades off some potential interference for channel monitoring.

At block 606, if the BS 106 determines that a monitoring packet is to be created, the monitoring module 308 may be used to create the monitoring packet as described above. At block 608, the monitoring packet is transmitted to one or more SAs 104 over wireless links 110. In some embodiments, the monitoring packets may be transmitted at a power level that is substantially below the nominal power level used to transmit work cycle packets. Transmitting at a lower power level decreases interference caused with neighboring mission-critical networks 120, and also reduces the SNIR of the transmission to allow channel measurement to be conducted with a low dynamic range. Reduction of the SNIR can also increase packet error rates of the monitoring packet, which can lead to more significant error statistics for channel measurement. Further, the lower power level may allow the system to avoid having to comply with the FCC's "listen-before-talk" requirements when transmitting in the unlicensed band. In some embodiments, multiple monitoring packets may be created and sent in succession to allow for determination of a packet error rate at the receiving SA 104. The packet error rate may be determined by comparing the number of packets successfully received to the number of packets sent.

At block 610, a receiving SA 104 may determine whether the received packet is a monitoring packet. The SA 104 may do this by performing a comparison between the fingerprint of the monitoring packet and a stored fingerprint for monitoring packets. Based on this comparison, the SA 104 can determine what type of packet has been received.

At block 612, if the SA 104 determines that a monitoring packet has been received, the SA 104 may conduct channel measurement using the reference signal enclosed in the monitoring packet. In some embodiments, the SA 104 may also determine a packet error rate based on receipt of a number of monitoring packets over time, for example by comparing the number of packets received to a number of packets expected. The number of packets expected may be pre-determined at system initiation, or may be included in packets sent by the BS 106.

At block 614, the SA 104 may process the channel measurement information and the packet error information. The SA 104 may cache this information, update an average channel metric, and/or derive related metrics from the channel measurement and packet error information. The SA 104 may further apply filtering to these metrics, for example it may compare error information to a pre-determined allowable threshold of channel state or a pre-determined allowable packet error rate.

At block 616, the SA 104 may cache the processed or unprocessed channel measurements, packet error rates, or any other metrics derived from the above processing. The SA 104 may further cache the channel resources (e.g., time period, frequency, coding, etc.) used to transmit the packet. The SA 104 may additionally cache any other information contained in the monitoring packet after decoding, for example a packet ID. The cached information may be forwarded to the BS 106 during the uplink (UL) phase below.

Figure 7:
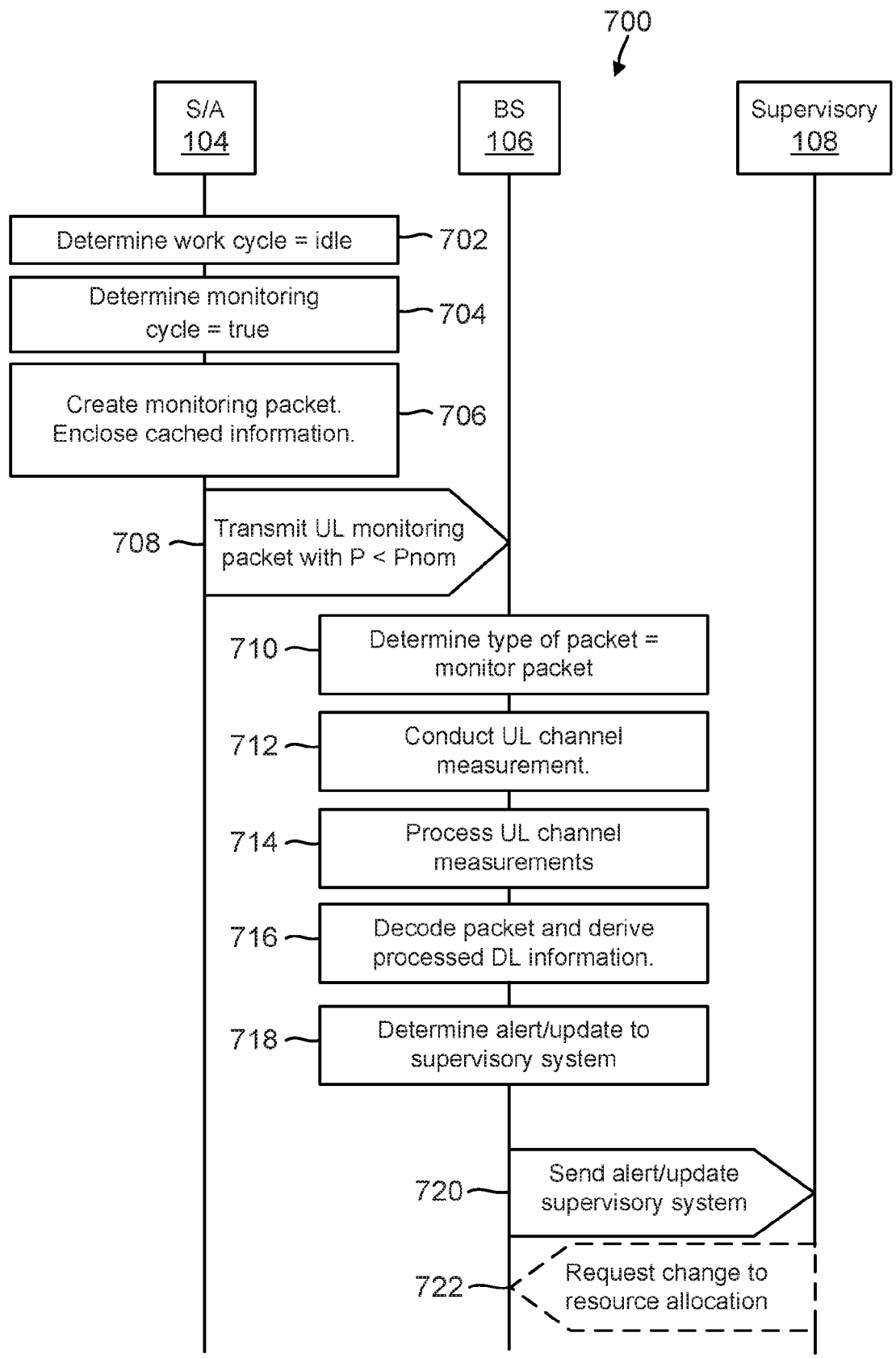
FIG. 7 is an illustration of call flow of uplink monitoring, from a sensor or actuator device to the base station, according to one aspect of the present disclosure.

FIG. 7 illustrates a call flow 700 of uplink (UL) monitoring, from an SA 104 to the BS 106, according to one aspect of the present disclosure. Beginning at block 702, the SA 104 at each opportunity for transmission determines whether it has a work packet to send or if the wireless link 110 will be idle. For example, the SA 104 may have received an ACK signal after transmitting data, and may subsequently determine that a certain number of subsequent frames scheduled for re-transmission will be unused for re-transmission. Alternatively, the SA 104 may be scheduled to transmit data but may have no data needs to be transmitted.

At block 704, if the system is idle, the SA 104 may determine if a monitoring packet should be sent. As described above, it is advantageous for the system to have as many idle frames as possible in order to reduce interference with neighboring mission-critical networks 120. Therefore, the system may have a predetermined rate of monitoring packets that trades off some potential interference for channel monitoring.

At block 706, if the SA 104 determines that a monitoring packet is to be created, the monitoring module 410 may be used to create the monitoring packet as described above. If the SA 104 has is cached information from block 616 of FIG. 6, it may enclose this information in the monitoring packet for. At block 708, the monitoring packet is transmitted to the BS 106 over wireless links 110. In some embodiments, the monitoring packets may be transmitted at a power level that is substantially below the nominal power level used to transmit work cycle packets, as described above.

At block 710, the receiving BS 106 may determine whether the received packet is a monitoring packet. The BS 106 may do this by performing a comparison between the fingerprint of the monitoring packet and a stored fingerprint for monitoring packets, and determine based on this comparison what type of packet has been received.

At block 712, if the BS 106 determines that a monitoring packet has been received, the BS 106 may conduct channel measurement using the reference signal enclosed in the monitoring packet. In some embodiments, the BS 106 may also determine a packet error rate based on receipt of a number of monitoring packets over time.

At block 714, the BS 106 may process the channel measurement information and the packet error information. The BS 106 may cache this information, update an average channel metric, or derive related metrics from the channel measurement and packet error information. The BS 106 may further apply filtering to these metrics, for example it may compare error information to a pre-determined allowable threshold of channel state or a pre-determined allowable packet error rate.

At block 716, the BS 106 may decode the monitoring packet and derive any processed DL monitoring data that was enclosed by the SA 104 at block 706 as well as any information about the channel resources used for transmission of the DL monitoring packets. At block 718, based on the UL measurements of blocks 712 and 74 and the DL measurements derived from the monitoring packet at block 716, the BS 106 may determine whether the supervisory system 108 needs to be alerted of the channel state. This decision may be based on comparison of the UL and DL measurements with threshold values for channel state, pre-determined allowable packet error rates, or the like.

At block 720, if the BS 106 determines that the supervisory system 108 needs to be alerted of the channel state, the BS 106 may transmit to the supervisory system 108 alert information. The alert information may include the processed and unprocessed UL and DL measurements and metrics as well as information about the channel resources used for transmission of the DL and UL monitoring packets.

At block 722, the supervisory system 108, upon receiving the alert information from block 720, may determine whether the channel state has deteriorated enough to warrant changing allocation of channel resources for the network 100. This may be determined by the channel estimation module 508 as described above with respect to FIG. 5.

Figure 8:
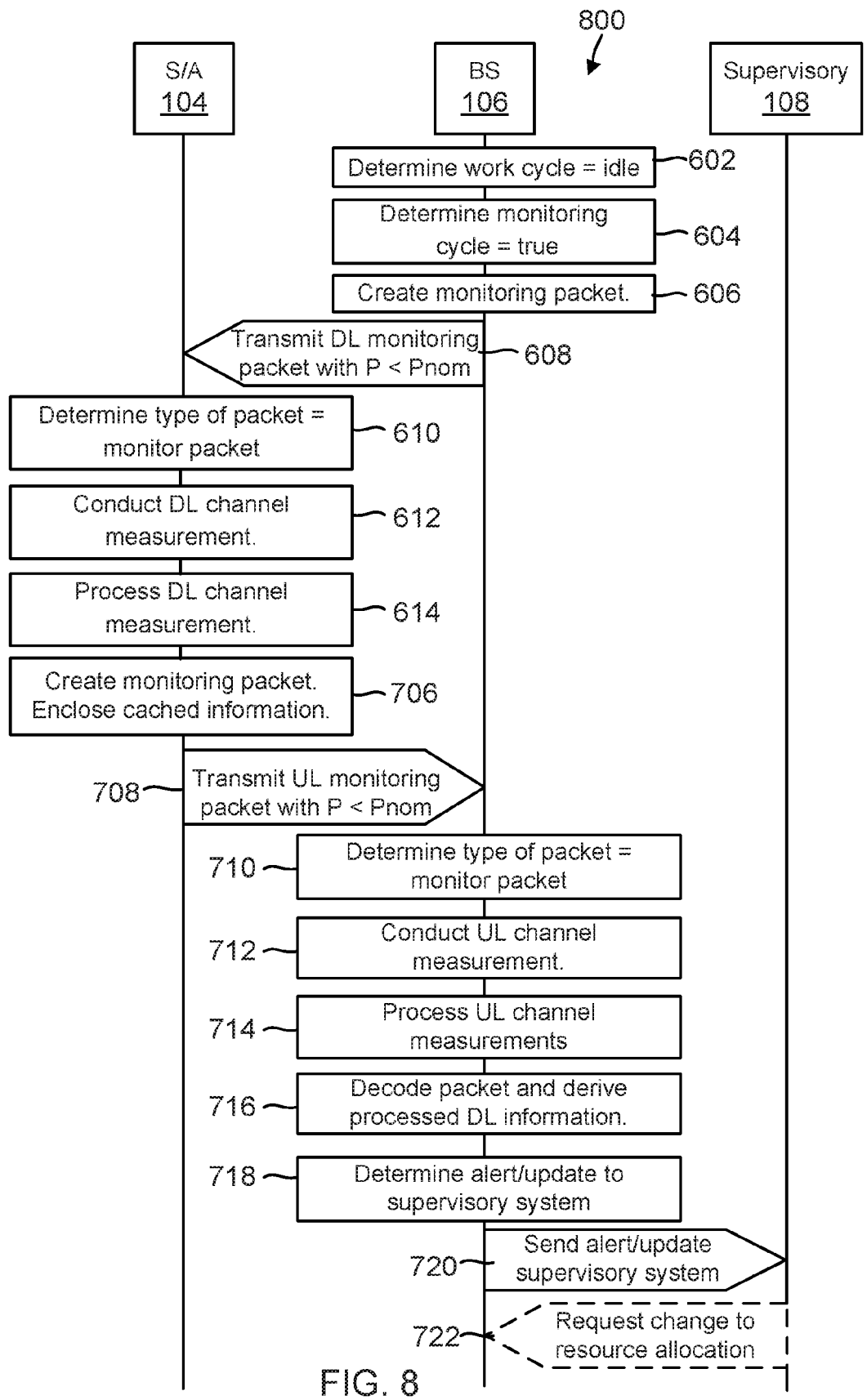
FIG. 8 there is illustrated a call flow involving both downlink and uplink monitoring between the base station and a sensor or actuator device according to an aspect of the present disclosure.

FIG. 8 illustrates a call flow 800 involving both DL and UL monitoring between the BS 106 and an SA 104 according to an aspect of the present disclosure. This call flow cycle applies to situations where a UL monitoring cycle predictably follows a DL monitoring cycle (e.g. a situation where the BS 106 determines that work traffic does not need to be sent for the duration of both the UL and DL monitoring cycles, and can schedule a monitoring cycle with one or more SAs 104). This call flow cycle is a concatenation of the call flow 700 of FIG. 7 with the call flow 600 of FIG. 6, with the removal of blocks 702 and 704 since the SA 104 does not need to determine in this case whether a monitoring packet has been received.

FIGS. 9A-9D illustrate a time frame structure 900 of the signals according to an aspect of the present disclosure. In this embodiment, the wireless interface between the BS 106 and SAs 104 uses a time slotted wireless interface with a frame structure. The wireless interface supports Time Division Duplexing (TDD), although the present disclosure may be applied to wireless interfaces supporting TDD and Frequency Division Duplexing (FDD) systems as well as mixed TDD/FDD systems, such as WSAN-FA or WISA. In this embodiment, each wireless link 110 between the BS 106 and an SA 104 "owns" a frequency. In some embodiments, frequency hopping may be applied to further take advantage of frequency diversity.

In the embodiment of FIGS. 9A-9D, DL frames 902 and UL frames 904 utilized by an SA 104 or a BS 106 use the same frequency band. Only one link (e.g., from one SA 104 to the BS 106 or vice versa) is shown for each of FIGS. 9A-9D, but multiple links may be active on different frequency sub-bands during the same time period. Each frame consists of two or more subframes, and each subframe consists of a data portion and an ACK/NACK portion. The frame length is chosen to satisfy the latency budget that can be tolerated by the mission-critical application. For example, the frame length may be chosen to correspond to the maximum latency tolerated.

Figure 9A:
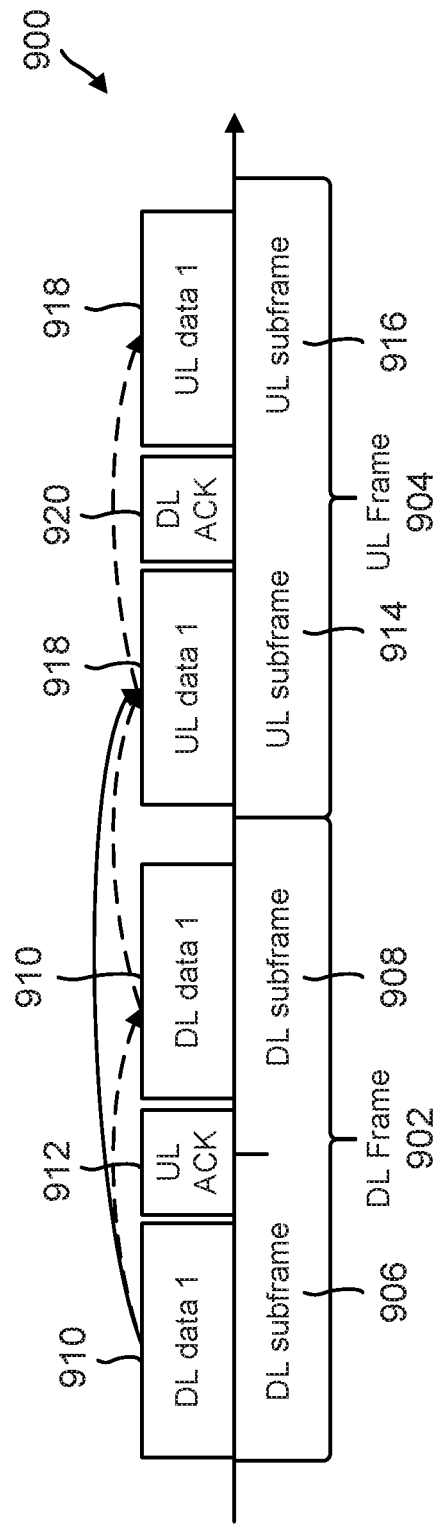
FIG. 9A is an illustration of operation of a system from the point of view of a base station during mission-critical application operation when re-transmission is necessary.

FIG. 9A illustrates the standard operation of the system from the point of view of the BS 106 during mission-critical application operation when re-transmission is necessary. In DL subframe 906, DL data packet 910 is sent from the BS 106 to an SA 104 during the data portion of DL subframe 906 and waits for a UL ACK 912 during the ACK/NACK portion of DL subframe 906. If no UL ACK 912 is received, or if a UL NACK is received, the BS 106 retransmits the data packet 910 in the DL subframe 908. In this embodiment, only one re-transmission opportunity is shown, but it is understood that multiple subframes may be allocated for re-transmission. There is a small time gap at the end of the DL frame 902 that is left for application layer processing before the beginning of the UL frame 904.

If the SA 104 received the data packet successfully, the mission-critical application may process the data and respond with a UL data packet 918 during UL frame 904. The SA 104 sends the UL data packet 918 during the data portion of UL subframe 914 and listens for a DL ACK 920 during the ACK/NACK portion of UL subframe 914. If no DL ACK 920 is received or if a DL NACK is received, the SA 104 retransmits the UL data packet 918 in the UL subframe 916. In this embodiment, only one re-transmission opportunity is shown, but it is understood that multiple subframes may be allocated for re-transmission. There is a small time gap at the end of the UL frame 904 that is left for application layer processing before the beginning of the next DL frame.

Figure 9B:
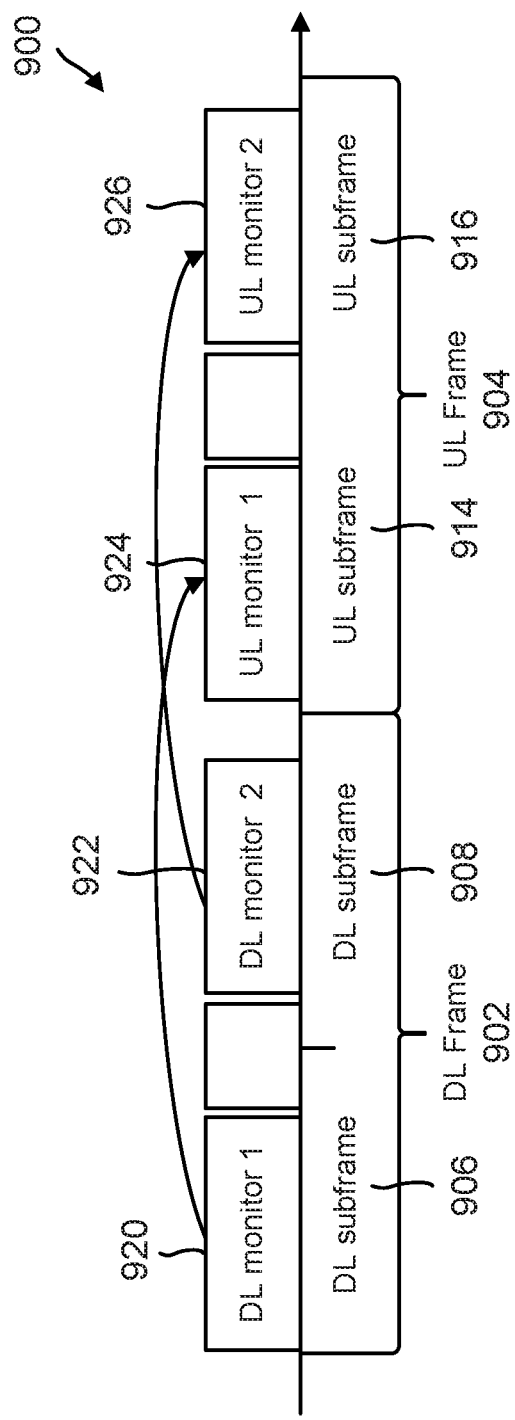
FIGS. 9B-9D are illustrations of an operation of the system from the point of view of a base station during parallel operation of a monitoring application and a mission-critical application.
Figure 9C:
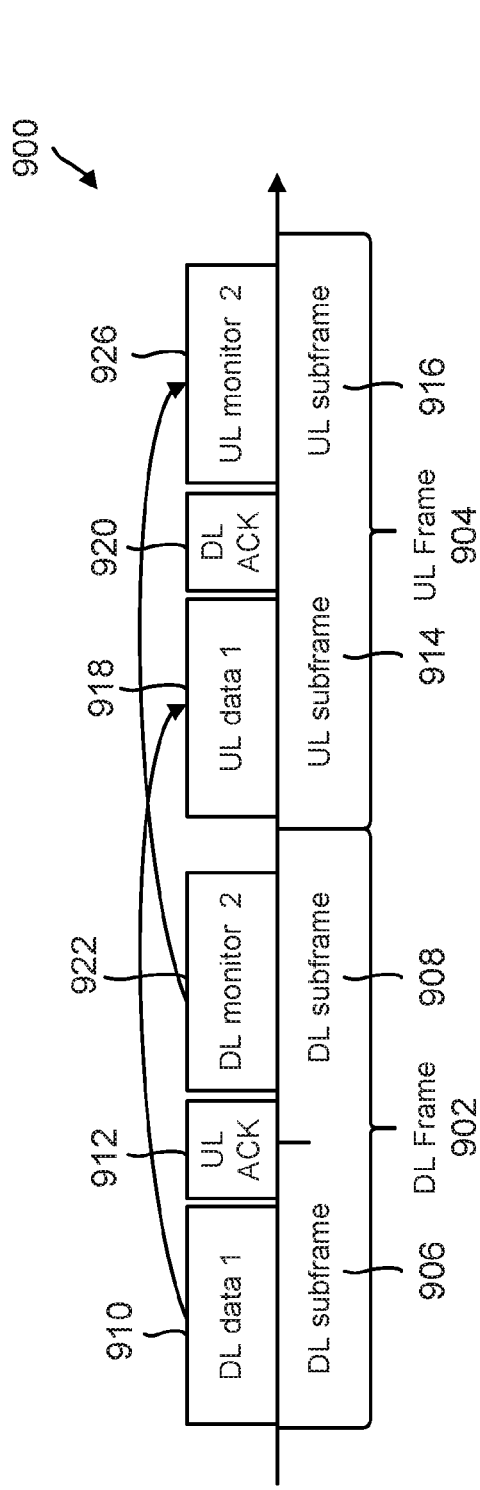
Figure 9D:
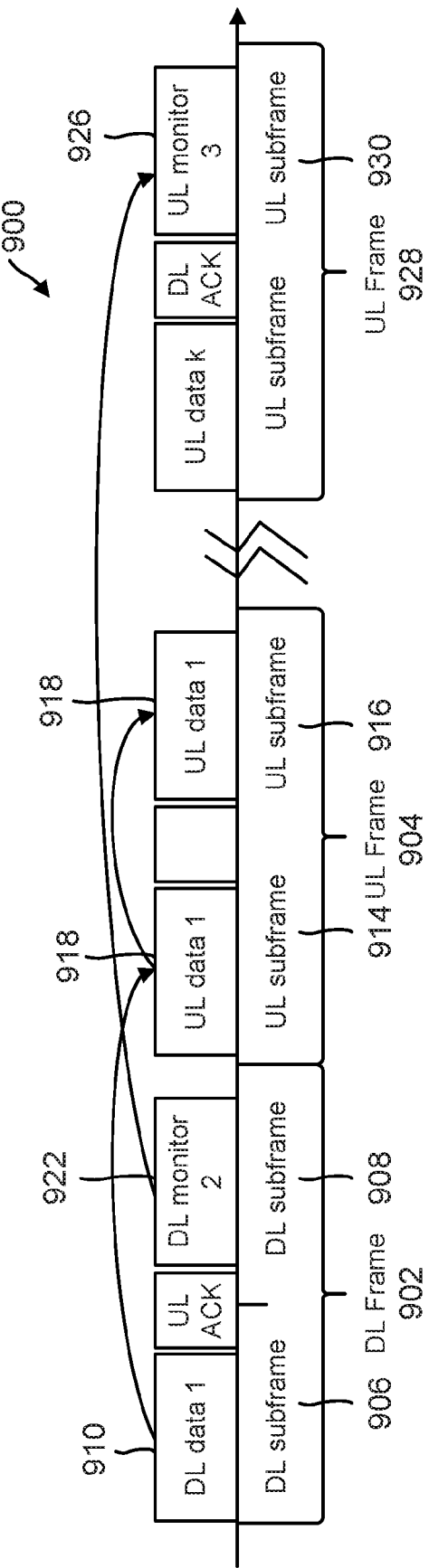

FIGS. 9B-9D illustrate different scenarios for operation of the system from the point of view of the BS 106 during parallel operation of the monitoring application and the mission-critical application. In each scenario, the controller 102 may create any data packets that need to be sent to SAs 104 in a given time period and pass them on to the BS 106 for transmission via wireless links 110. The BS 106 evaluates for which links 110 the controller 102 has sent data packets, and determines that all other links 110 are in an idle cycle.

In FIG. 9B, the BS 106 may then decide to send monitoring packets to an idle SA 104 in one or both of DL subframes 906 and 908 of the DL frame 902. It is not necessary for the SA 104 to send an ACK to acknowledge receipt of the monitoring packets. Instead, if the SA 104 receives a DL monitoring packet 920 during the first DL subframe 906 it may respond with a UL monitoring packet 924 during the first UL subframe 914. Likewise, if the SA 104 receives a DL monitoring packet 922 during the second DL subframe 908 it may respond with a UL monitoring packet 926 during the second UL subframe 916.

In FIG. 9C, at the end of the first DL subframe 906, the BS 106 determines which SAs 104 in active work cycles (i.e., SAs 104 that were sent a mission-critical data packet 910 during DL subframe 906) received a UL ACK 912 during the ACK/NACK portion of DL subframe 906. Such SAs 104 do not require re-transmission during DL subframe 908, and the BS 106 may send a DL monitoring packet 926 during the DL subframe 908 instead. The SA 104 must respond to the mission-critical DL packet 910 with a mission-critical UL packet 918 during the UL subframe 914, but if it receives a DL ACK 920 during the ACK/NACK portion of UL subframe 914, the SA 104 may send a UL monitoring packet 926 in response to the DL monitoring packet 922.

If, however, no DL ACK 920 is received or a DL NACK is received, as shown in FIG. 9D, the SA 104 may re-transmit the UL data packet 918 during UL subframe 916. Accordingly, the SA 104 may postpone sending the UL monitoring packet 926 until a later UL frame 928 during which there is a free UL subframe 930.

Figure 10:
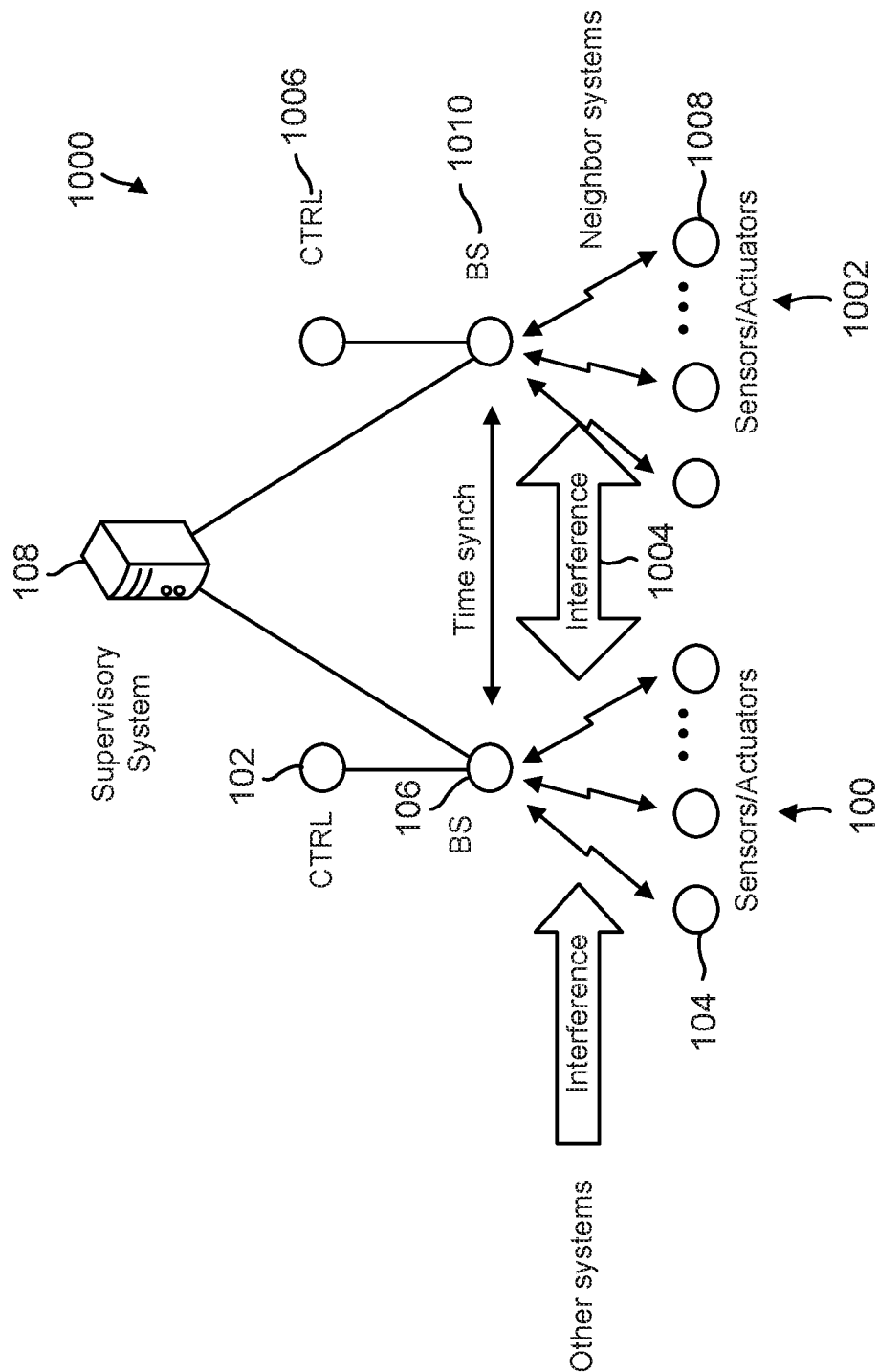
FIG. 10 is an illustration of a system involving coordination of resource allocation between multiple neighboring mission-critical networks.

FIG. 10 is an illustration of a system 1000 involving coordination of resource allocation between multiple neighboring mission-critical networks 100 and 1002. In this embodiment, the networks 100 and 1002 may create mutual interference 1004. This may be mitigated by connecting the supervisory control system 108 to both networks 100 and 1002 to allow coordination of allocation of channel resources to avoid overlap. For this to succeed, time synchronization of all wireless devices on both networks 100 and 1002 is desirable. This may be achieved as described above with beacons periodically transmitted at a pre-determined time and frequency to each wireless device of networks 100 and 1002 (e.g., each SA 104 and 1008 and each BS 106 and 1010).

Furthermore, each network 100 and 1002 may run its own monitoring application in parallel with its mission-critical application, reporting channel measurement data and channel resource usage to the supervisory system 108. The supervisory system 108 may then cross-correlate the work cycle traffic on one network (e.g., network 100) with interference measured by the monitoring traffic on another network (e.g., network 1002) to determine if there is conflict between channel resources. The supervisory system 108 may adjust resource allocations accordingly.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   determining, at a first wireless communication device, whether there is a data packet to be transmitted to a second wireless communication device;
   determining, at the first wireless communication device, whether a monitoring packet should be transmitted to the second wireless communication device if it is determined that no data packet needs to be transmitted; and
   transmitting, from the first wireless communication device to the second wireless communication device, the monitoring packet,
   wherein the monitoring packet includes an identifier and a reference signal.

2. The method of claim 1, further comprising creating, at the first wireless communication device, the monitoring packet in the event that the first wireless communication device determines that the monitoring packet should be transmitted.

3. The method of claim 1, wherein the monitoring packet further includes downlink channel measurement data.

4. The method of claim 1, wherein the monitoring packet is transmitted at a power level below a nominal power level that would be used to transmit the data packet.

5. The method of claim 1, wherein the determining that no data packet needs to be transmitted is based on receipt, at the first wireless communication device from the second wireless communication device, of an acknowledgment (ACK) of a previously sent data packet in a preceding time period.

6. The method of claim 1, further comprising:
   receiving, at the first wireless communication device from the second wireless communication device, a packet including an identifier;
   determining, at the first wireless communication device, whether the received packet is a data packet or a monitoring packet;
   conducting, at the first wireless communication device, channel measurement using information from the received packet to produce uplink channel measurement data.

7. The method of claim 6, wherein the channel measurement is conducted using the reference signal of the monitoring packet.

8. The method of claim 6, wherein the determining whether the received packet is a data packet or a monitoring packet further comprises comparing the identifier of the received packet with a stored identifier.

9. The method of claim 6, further comprising:
   cacheing, at the first wireless communication device, the uplink channel measurement data; and
   transmitting, from the first wireless communication device to the second wireless communication device, at a later time, the cached uplink channel measurement data.

10. The method of claim 6, further comprising:
    decoding, at the first wireless communication device, the received packet to retrieve downlink channel measurement data; and
    determining, at the first wireless communication device, based on at least one of the uplink channel measurement data or the downlink channel measurement data, whether a channel state alert should be sent to a communication device.

11. The method of claim 10, further comprising transmitting, from the first wireless communication device to the communication device, the channel state alert, along with at least one of the uplink channel measurement data or the downlink channel measurement data.

12. The method of claim 10, further comprising:
    receiving, at the first wireless communication device from the communication device, a channel resource allocation;
    allocating channel resources for transmissions to the second wireless communication device based on the received channel resource allocation; and
    transmitting, from the first wireless communication device to the second wireless communication device, data indicating the received channel resource allocation.

13. A method of wireless communication, comprising:
    receiving, at a communication device from a first wireless communication device, a channel state alert along with at least one of uplink channel measurement data or downlink channel measurement data in response to the first wireless communication device determining based on at least one of the uplink channel measurement data or the downlink channel measurement data, received from a second wireless communication device, that the channel state alert should be sent; and determining, at the communication device, based on the channel state alert, the uplink channel measurement data or the downlink channel measurement data whether channel resource reallocation is necessary to avoid errors.

14. The method of claim 13, further comprising:
determining, at the communication device, the channel resource reallocation if channel resource reallocation is determined to be necessary.

15. The method of claim 13, further comprising:
transmitting, from the communication device to the first wireless communication device, data indicating the channel resource reallocation.

16. The method of claim 13, wherein the determining whether channel resource reallocation is necessary includes comparing at least one of the channel measurement data or the downlink channel measurement data to threshold values for acceptable channel measurements.

17. A first wireless communication device, comprising:
a processor configured to determine whether there is a data packet to be transmitted to a second wireless communication device, the processor further configured to determine, if there is no data packet to be transmitted, whether a monitoring packet including an identifier and a reference signal should be transmitted to the second wireless communication device; and
a transceiver configured to transmit the monitoring packet to the second wireless communication device.

18. The first wireless communication device of claim 17, wherein the processor is further configured to generate the monitoring packet.

19. The first wireless communication device of claim 17, wherein the monitoring packet further includes downlink channel measurement data.

20. The first wireless communication device of claim 17, wherein the transceiver is further configured to transmit the monitoring packet at a power level below a nominal power level that would be used to transmit the data packet.

21. The first wireless communication device of claim 17, wherein the processor determines that no data packet needs to be transmitted based on receipt, by the transceiver, of an acknowledgment (ACK) of a previously sent data packet in a preceding time period.

22. The first wireless communication device of claim 17, wherein
the transceiver is further configured to receive a packet including an identifier,
the processor is further configured to determine whether the received packet is a data packet or a monitoring packet, and
the processor is further configured to conduct channel measurement using information from the received packet to produce uplink channel measurement data.

23. The first wireless communication device of claim 22, wherein the channel measurement is conducted using information from the received packet.

24. The first wireless communication device of claim 22, wherein:
the processor is further configured to decode the received packet to retrieve downlink channel measurement data, and
the processor is further configured to determine, based on at least one of the uplink channel measurement data or the downlink channel measurement data, whether a channel state alert should be sent to a communication device.

25. The first wireless communication device of claim 24, wherein:
the transceiver is further configured to receive from the communication device a channel resource allocation,
the processor is further configured to allocate channel resources for transmissions to the second wireless communication device based on the received channel resource allocation, and
the transceiver is further configured to transmit to the second wireless communication device data indicating the received channel resource allocation.

26. The first wireless communication device of claim 22, wherein:
the processor is further configured to cache the uplink channel measurement data, and
the transceiver is further configured to transmit to the second wireless communication device, at a later time, the cached uplink channel measurement data.

27. A communication device, comprising:
a transceiver configured to receive, from a first wireless communication device, a channel state alert along with at least one of uplink channel measurement data or downlink channel measurement data in response to the first wireless communication device determining based on at least one of the uplink channel measurement data or the downlink channel measurement data, received from a second wireless communication device, that the channel state alert should be sent; and
a processor configured to determine, based on the channel state alert, the uplink channel measurement data or the downlink channel measurement data whether channel resource reallocation is necessary to avoid errors.

28. The communication device of claim 27, wherein the processor is further configured to determine the channel resource reallocation if channel resource reallocation is determined to be necessary.

29. The communication device of claim 28, the transceiver further configured to transmit to the first wireless communication device data indicating the channel resource reallocation.

30. The communication device of claim 27, wherein the determining whether channel resource reallocation is necessary includes comparing at least one of the channel measurement data or the downlink channel measurement data to threshold values for acceptable channel measurements.

31. A non-transitory computer-readable storage medium having program code recorded thereon, the program code comprising:
code for causing a first wireless communication device to determine whether there is a data packet to be transmitted to a second wireless communication device;
code for causing the first wireless communication device to determine whether a monitoring packet should be transmitted to the second wireless communication device if it is determined that no data packet needs to be transmitted; and
code for causing the first wireless communication device to transmit to the second wireless communication device the monitoring packet,
wherein the monitoring packet includes an identifier and a reference signal.

32. The non-transitory computer-readable storage medium of claim 31, the program code further comprising:

code for causing the first wireless communication device to transmit the monitoring packet at a power level below a nominal power level that would be used to transmit the data packet.

33. The non-transitory computer-readable storage medium of claim 31, wherein the determining that no data packet needs to be transmitted is based on receipt, at the first wireless communication device from the second wireless communication device, of an acknowledgment (ACK) of a previously sent data packet in a preceding time period.

34. The non-transitory computer-readable storage medium of claim 31, the program code further comprising:
code for causing the first wireless communication device to receive, from the second wireless communication device, a packet including an identifier;
code for causing the first wireless communication device to determine whether the received packet is a data packet or a monitoring packet;
code for causing the first wireless communication device to conduct channel measurement using information from the received packet to produce uplink channel measurement data.

35. The non-transitory computer-readable storage medium of claim 34, the program code further comprising:
code for causing the first wireless communication device to decode the received packet to retrieve downlink channel measurement data; and
code for causing the first wireless communication device to determine, based on at least one of the uplink channel measurement data or the downlink channel measurement data, whether a channel state alert should be sent to a communication device.

36. The non-transitory computer-readable storage medium of claim 35, the program code further comprising:
code for causing the first wireless communication device to receive from the communication device a channel resource allocation;
code for causing the first wireless communication device to allocate channel resources for transmissions to the second wireless communication device based on the received channel resource allocation; and
code for causing the first wireless communication device to transmit to the second wireless communication device data indicating the received channel resource allocation.

37. The non-transitory computer-readable storage medium of claim 34, the program code further comprising:
code for causing the first wireless communication device to cache the uplink channel measurement data; and
code for causing the first wireless communication device to transmit to the second wireless communication device, at a later time, the cached uplink channel measurement data.

38. A non-transitory computer-readable storage medium having program code recorded thereon, the program code comprising:
code for causing a communication device to receive, from a first wireless communication device, a channel state alert along with at least one of uplink channel measurement data or downlink channel measurement data in response to the first wireless communication device determining based on at least one of the uplink channel measurement data or the downlink channel measurement data, received from a second wireless communication device, that the channel state alert should be sent; and
code for causing the communication device to determine, based on the channel state alert, the uplink channel measurement data or the downlink channel measurement data whether channel resource reallocation is necessary to avoid errors.

39. The non-transitory computer-readable storage medium of claim 38, the program code further comprising:
code for causing the communication device to determine the channel resource reallocation if channel resource reallocation is determined to be necessary.

40. The non-transitory computer-readable storage medium of claim 38, wherein the determining whether channel resource reallocation is necessary includes comparing at least one of the channel measurement data or the downlink channel measurement data to threshold values for acceptable channel measurements.

* * * * *